(12) United States Patent
Fujiwara et al.

(10) Patent No.: US 8,173,755 B2
(45) Date of Patent: May 8, 2012

(54) ULTRA HIGH MOLECULAR WEIGHT ETHYLENE COPOLYMER POWDER

(75) Inventors: Akio Fujiwara, Tokyo (JP); Koichi Hasebe, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 705 days.

(21) Appl. No.: 11/793,378

(22) PCT Filed: Dec. 28, 2005

(86) PCT No.: PCT/JP2005/024133
§ 371 (c)(1),
(2), (4) Date: Jun. 19, 2007

(87) PCT Pub. No.: WO2006/070886
PCT Pub. Date: Jul. 6, 2006

(65) Prior Publication Data
US 2008/0071031 A1    Mar. 20, 2008

(30) Foreign Application Priority Data
Dec. 28, 2004    (JP) ................. 2004-378468

(51) Int. Cl.
C08F 4/50     (2006.01)
C08F 4/52     (2006.01)
C08F 210/02   (2006.01)

(52) U.S. Cl. ........... 526/124.5; 526/124.3; 526/124.1; 526/123.1; 526/155; 526/154; 526/348

(58) Field of Classification Search .......... 526/352, 526/353, 348, 124.5, 154, 155
See application file for complete search history.

(56) References Cited

U.S. PATENT DOCUMENTS

| | | | | | |
|---|---|---|---|---|---|
| 4,159,965 | A | * | 7/1979 | Sakurai et al. | 502/116 |
| 4,255,280 | A | * | 3/1981 | Sakurai et al. | 502/116 |
| 4,390,666 | A | * | 6/1983 | Moriguchi et al. | 525/194 |
| 4,431,568 | A | * | 2/1984 | Miya et al. | 502/119 |
| 4,786,687 | A | * | 11/1988 | Sano et al. | 525/240 |
| 4,946,371 | A | * | 8/1990 | Shiraki et al. | 428/36.9 |
| 5,266,666 | A | * | 11/1993 | Kamiishi et al. | 526/125.3 |
| 5,401,820 | A | * | 3/1995 | McDaniel et al. | 526/348.5 |
| 5,494,629 | A | * | 2/1996 | Gorden et al. | 264/126 |
| 5,990,034 | A | * | 11/1999 | Nozaki | 502/132 |
| 6,114,271 | A | * | 9/2000 | Bilda et al. | 502/105 |
| 6,559,249 | B2 | * | 5/2003 | Yang et al. | 526/124.3 |
| 2002/0040113 | A1 | * | 4/2002 | Fritzsche et al. | 526/129 |
| 2006/0287449 | A1 | * | 12/2006 | Miyamoto et al. | 526/160 |

FOREIGN PATENT DOCUMENTS

| | | | |
|---|---|---|---|
| EP | 0 317 200 A1 | | 5/1989 |
| EP | 0 479 588 A1 | | 4/1992 |
| EP | 0 523 657 A2 | | 1/1993 |
| EP | 0 581 611 A2 | | 2/1994 |
| JP | 60-115638 A | * | 6/1985 |
| JP | 60-158205 | | 8/1985 |
| JP | 61-502061 | | 9/1986 |
| JP | 62-57406 | | 3/1987 |
| JP | 62-243611 | | 10/1987 |
| JP | 03-47810 A | * | 2/1991 |
| JP | 5-70519 A | * | 3/1993 |
| JP | 5-320244 | | 3/1993 |
| WO | WO 85/04365 A1 | * | 10/1985 |
| WO | WO 01/81432 A1 | | 11/2001 |

OTHER PUBLICATIONS

Supplementary European Search Report for related European Patent Application No. EP 05 84 4880, dated Feb. 10, 2009.
PCT International Preliminary Report on Patentability (4 pages) dated Jul. 3, 2007.

* cited by examiner

Primary Examiner — Rip A. Lee
(74) Attorney, Agent, or Firm — Finnegan, Henderson, Farabow, Garrett & Dunner, L.L.P.

(57) ABSTRACT

The present invention relates to an ultrahigh-molecular-weight ethylene copolymer powder having an intrinsic viscosity ($\eta$) of 10 dl/g to 34 dl/g, obtainable by copolymerizing ethylene and at least one olefin selected from the group consisting of α-olefins having 3 to 20 carbon atoms, cyclic olefins having 3 to 20 carbon atoms, compounds represented by the formula $CH_2=CHR^1$ wherein $R^1$ is an aryl group having 6 to 20 carbon atoms, and linear, branched or cyclic dienes having 4 to 20 carbon atoms, wherein
(1) a molded article of the copolymer powder has a haze of from 30% to 80% and (2) the copolymer powder has a bulk density of from 0.35 g/cm³ to 0.6 g/cm³.

3 Claims, No Drawings

ULTRA HIGH MOLECULAR WEIGHT ETHYLENE COPOLYMER POWDER

TECHNICAL FIELD

The present invention relates to an ultrahigh-molecular-weight ethylene copolymer powder having an ultrahigh molecular weight and an intrinsic viscosity (η) of 10 dl/g or more, a high bulk density, an excellent transparency, and a good flexibility, as well as a molded article and a fiber obtained from the copolymer powder.

BACKGROUND ART

Hitherto, ultrahigh-molecular-weight polyolefin, particularly ultrahigh-molecular-weight polyethylene is excellent in impact resistance, abrasion resistance, sliding properties, and chemical resistance as compared with commonly used polyethylene, and can be used as sliding parts. Furthermore, since the polyolefin has a small friction coefficient, it is used in skis and the like. However, since the ultrahigh-molecular-weight polyethylene usually has a high crystallinity and shows a white opaque appearance, it is inferior in transparency even when it is molded into a thin sheet or film and thus designing ability for brand names and the like on soles of skis is impaired, so that a material excellent in transparency is desired. For the purpose of improving transparency thereof, Patent Document 1 proposes an ultrahigh-molecular-weight ethylene copolymer obtained from ethylene and another α-olefin.

Since ultrahigh-molecular-weight polyethylene has a high molecular weight and a bad flowability when melted, it is difficult to mold it into a pellet form in production sites unlike the case of usual polyethylene and hence it has been shipped in a powder form. Therefore, the ultrahigh-molecular-weight polyethylene in a powder form has been used at its molding.

In molding sites, bulk density of a powder is extremely important. For example, an ultrahigh-molecular-weight molded article for skis has been produced by filling a cylindrical mold with the ultrahigh-molecular-weight polyethylene powder and subjecting it to compression molding, followed by scraping the molded article thinly in the circumferential direction. At this time, in the case that the bulk density of the ultrahigh-molecular-weight polyethylene powder is low, there arise problems that a sufficient weight of the ultrahigh-molecular-weight polyethylene powder for the molded article does not enter into the mold at its filling and bubbles are apt to be present in the molded article. For solving the problems, there may be considered a method of using a mold having a larger volume and extending the molding time but there arises a problem that electric power to be consumed remarkably increases because of increased heat capacity and heat radiation of the mold. In addition, since the method requires increased working distance and working time of a compressor, molding efficiency remarkably decreases.

On the other hand, also in the production of the ultrahigh-molecular-weight polyethylene powder, the bulk density of the ultrahigh-molecular-weight polyethylene powder formed is very important. Since it is possible to increase weight of the ultrahigh-molecular-weight polyethylene per unit volume contained in a polymerization vessel by increasing the bulk density, concentration of the ultrahigh-molecular-weight polyethylene powder in the polymerization vessel can be enhanced. Thereby, it is possible to enhance productivity of the ultrahigh-molecular-weight polyethylene even in the same process. Moreover, in the case of transporting and storing the ultrahigh-molecular-weight polyethylene powder discharged from the polymerization vessel, the bulk density is important. A higher bulk density may decrease clogging at its transportation and it is possible to increase a storable amount per unit volume.

It is generally known that the bulk density of the ultrahigh-molecular-weight polyethylene powder is increased by adding an additive, e.g., a lubricant such as calcium stearate. On the other hand, it is also known that the additive deteriorates thermal fusibility at molding and the additive also contaminates the surface of the molded article because of its bleeding onto the surface. For the reasons, it is desired to enhance the productivity of the ultrahigh-molecular-weight polyethylene powder and to increase the bulk density in the state where no additive is present.

As above, the bulk density of the ultrahigh-molecular-weight polyethylene powder is one of very important properties necessary for ultrahigh-molecular-weight polyethylene. However, in Patent Document 1, the extremely important bulk density of the ultrahigh-molecular-weight polyethylene powder has not been investigated.

[Patent Document 1] JP-B-5-86803

DISCLOSURE OF THE INVENTION

Problems that the Invention is to Solve

The present invention is carried out in consideration of the above problems and an object thereof is to provide an ultrahigh-molecular-weight ethylene copolymer powder which can be produced at a temperature efficient in an industrial process, have a high bulk density, is excellent in transparency, and is flexible.

Means for Solving the Problems

As a result of extensive studies for solving the above problems, the present inventors have found an ultrahigh-molecular-weight ethylene copolymer powder which can be produced at a temperature efficient in an industrial process, have a high bulk density, is excellent in transparency, and is flexible, and thus they have accomplished the invention.

Namely, the invention is as follows.

1) An ultrahigh-molecular-weight ethylene copolymer powder having an intrinsic viscosity (η) of 10 dl/g to 34 dl/g, obtainable by copolymerizing ethylene and at least one olefin selected from the group consisting of α-olefins having 3 to 20 carbon atoms, cyclic olefins having 3 to 20 carbon atoms, compounds represented by the formula $CH_2=CHR^1$ wherein $R^1$ is an aryl group having 6 to 20 carbon atoms, and linear, branched or cyclic dienes having 4 to 20 carbon atoms, wherein (1) a molded article of the copolymer powder has a haze of from 30% to 80% and
(2) the copolymer powder has a bulk density of from 0.35 g/cm³ to 0.60 g/cm³.

2) The ultrahigh-molecular-weight ethylene copolymer powder according to claim 1, which is produced in the presence of an olefin polymerization catalyst which comprises a solid catalyst component [A] and an organometallic compound component [B] and wherein the solid catalyst component [A] is prepared by supporting a titanium compound (A-2) represented by the below-shown general formula 3 on a support (A-1) prepared by a reaction of an organomagnesium compound represented by the below-shown general formula 1 soluble in an inert hydrocarbon solvent with a chlorinating agent represented by the below-shown general formula 2 at a temperature of 60° C. to 150° C.;

$$(M^1)_\alpha(Mg)_\beta(R^2)_a(R^3)_b(OR^4)_c \qquad \text{formula 1}$$

wherein $M^1$ is a metal atom belonging to the group consisting of Group 1, Group 2, Group 12, and Group 13 of the periodic table except magnesium, $R^2$, $R^3$, and $R^4$ each is a hydrocarbon group having 2 to 20 carbon atoms, and α, β, a, b, and c each is a real number satisfying the following relations: $0 \leq \alpha$, $0 < \beta$, $0 \leq a$, $0 \leq c$, $0 < a+b$, $0 \leq c/(\alpha+\beta) \leq 2$, $k\alpha + 2\beta = a+b+c$ (wherein k is an atomic valency of $M^1$),

$$H_d SiCl_e R^5{}_{(4-(d+e))} \quad \text{formula 2}$$

wherein $R^5$ is a hydrocarbon group having 1 to 12 carbon atoms and d and e each is an real number satisfying the following relations: $0 < d$, $0 < e$, $0 < d+e \leq 4$,

$$Ti(OR^6)_f X_{(4-f)} \quad \text{formula 3}$$

wherein f is a real number of 0 to 4, $R^6$ is a hydrocarbon group having 1 to 20 carbon atoms, and X is a halogen atom.

Advantage of the Invention

The ultrahigh-molecular-weight ethylene copolymer powder of the invention has advantages that intrinsic viscosity (η) is 10 dl/g or more, a balance of abrasion properties, physical properties, and moldability is excellent, as well as density is low and transparency and flexibility are excellent as compared with conventional ultrahigh-molecular-weight ethylene. Furthermore, it has a high bulk density in an industrial process and can be produced stably and continuously over a long period of time.

BEST MODE FOR CARRYING OUT THE INVENTION

The following will describe the invention specifically.

First, a specific embodiment of the ultrahigh-molecular-weight ethylene copolymer powder in the invention will be described. In the invention, the ultrahigh-molecular-weight ethylene copolymer powder of the invention can be produced by copolymerizing ethylene and at least one olefin selected from the group consisting of an α-olefin having 3 to 20 carbon atoms, a cyclic olefin having 3 to 20 carbon atoms, a compound represented by the formula $CH_2 = CHR^1$ wherein $R^1$ is an aryl group having 6 to 20 carbon atoms, and a linear, branched, or cyclic diene having 4 to 20 carbon atoms.

The α-olefin having 3 to 20 carbon atoms in the invention is, for example, selected from the group consisting of propylene, 1-butene, 1-pentene, 1-hexene, 4-methyl-1-pentene, 1-octene, 1-decene, 1-dodecene, 1-tetradecene, 1-hexadecene, 1-octadecene, and 1-eicocene. The cyclic olefin having 3 to 20 carbon atoms is, for example, selected from the group consisting of cyclopentene, cyclohexene, cycloheptene, norbornene, 5-methyl-2-norbornene, tetracyclododecene, and 2-methyl-1.4,5.8-dimethano-1,2,3,4,4a,5,8,8a-octahydronaphthalene. The compound represented by the formula $CH_2 = CHR^1$ wherein $R^1$ is an aryl group having 6 to 20 carbon atoms is, for example, styrene, vinylcyclohexane, or the like, and the linear, branched, or cyclic diene having 4 to 20 carbon atoms is, for example, selected from the group consisting of 1,3-butadiene, 1,4-pentadiene, 1,5-hexadiene, 1,4-hexadiene, 1,6-octadiene, 1,7-octadiene, and cyclohexadiene. Of these, preferred are propylene, 1-butene, 1-pentene, 1-hexene, 4-methyl-1-pentene, cyclopentene, norbornene, styrene, vinylcyclohexane, 1,5-hexadiene, and 1,7-octadiene and particularly preferred are propylene, 1-butene, 1-pentene, 1-hexene, 1,5-hexadiene, and 1,7-octadiene.

In the invention, it is possible to control physical properties such as density, flexibility, and transparency of a molded article of the ultrahigh-molecular-weight ethylene copolymer powder by copolymerizing ethylene and the above olefin(s) (comonomer(s)).

The content of the comonomer(s) in the copolymer is in the range of preferably from 0.01 mol % to 5 mol %, more preferably from 0.1 mol % to 2 mol %, even more preferably from 0.2 mol % to 1.0 mol %. For improving transparency, it is desired to contain the copolymer(s) in an amount of 0.01 mol % or more in the copolymer. When the content of the α-olefin exceeds 5 mol %, the density remarkably decreases and there is a possibility that a stable operation cannot be performed in a suspension polymerization process since the copolymer may dissolve in a solvent to be used or an agglomerated polymer may form. In addition, also in a gas-phase polymerization process, since the resulting polymer tends to be sticky, an agglomerated polymer forms, or it adheres onto inner surface of a reactor as a scale, a stable continuous operation cannot be performed.

The intrinsic viscosity η of the ultrahigh-molecular-weight ethylene copolymer powder of the invention measured in decalin at 135° C. is from 10 dl/g to 34 dl/g, preferably from 11 dl/g to 29 dl/g. An ultrahigh-molecular-weight polyethylene powder having η of less than 10 dl/g may possibly show a remarkable deterioration of abrasion resistance necessary for the copolymer. An ultrahigh-molecular-weight ethylene copolymer powder having η exceeding 34 dl/g may possibly show a remarkable deterioration of moldability.

In general, intrinsic viscosity has been widely used for the measurement of molecular weight of a polymer and viscosity-average molecular weight (Mv) of the ultrahigh-molecular-weight ethylene copolymer powder of the invention can be determined from η (dl/g) determined by dissolving the ultrahigh-molecular-weight ethylene copolymer powder in decalin in different concentration and extrapolating the solution viscosity determined at 135° C. to concentration of 0 according to the following numerical formula 1:

$$Mv = (5.34 \times 10^4) \times \eta^{1.49} \quad \text{numerical formula 1}$$

Mv of the ultrahigh-molecular-weight ethylene copolymer powder of the invention determined according to the formula is usually from 1,000,000 to 10,000,000, preferably from 2,000,000 to 8,000,000. An ultrahigh-molecular-weight ethylene copolymer powder having Mv of less than 1,000,000 may possibly show a remarkable deterioration of abrasion resistance necessary for the copolymer. An ultrahigh-molecular-weight ethylene copolymer powder having Mv exceeding 10,000,000 may possibly show a remarkable deterioration of moldability.

In the invention, a method of controlling molecular weight of the resulting ultrahigh-molecular-weight ethylene copolymer powder is not particularly limited but, for example, the molecular weight can be controlled by hydrogen concentration relative to ethylene in the polymerization vessel, polymerization temperature, and concentration of the organometallic compound [B]. Specifically, the molecular weight can be increased by lowering the hydrogen concentration relative to ethylene in the polymerization vessel. Moreover, the molecular weight can be increased by lowering the temperature in the polymerization vessel. Furthermore, the molecular weight can be increased by lowering the concentration of the organometallic compound [B].

In the case that haze as a measure of transparency of the ultrahigh-molecular-weight ethylene copolymer powder of the invention is measured by the method of ASTM D1003, the haze is from 30% to 80%, preferably from 30% to 75%. In the invention, by pressing the ultrahigh-molecular-weight ethylene copolymer according to ASTM D1928 Procedure C using a mold having a size of 60 mm×60 mm and a thickness of 2 mm, a press sheet is prepared and the haze of the press sheet is regarded as "haze of molded article of copolymer powder". Specifically, first, an aluminum plate having a thickness of 0.1 mm is placed on a smooth iron plate having a thickness of 5 mm and a polyethylene phthalate film having a thickness of 50 µm which is not coated with cellophane is further placed thereon. The mold having a size of 60 mm×60 mm and a thickness of 2 mm is placed thereon and 8 g of the ultrahigh-molecular-weight ethylene copolymer is charged therein. The above polyethylene terephthalate film is placed thereon, which is further covered with the above aluminum plate and further with the above iron plate. The mold is placed in a compression-molding machine whose temperature is controlled at 190° C. and heated at 190° C. for 900 seconds. Then, air is released for 5 seconds (100 K/G) and then, pressurization at 200 K/G is carried out for 300 seconds. After the pressurization, a sample is taken out. After 5 seconds, it is placed in a compression-molding machine whose temperature is controlled at 25° C. and then cooled at a rate of 15±2° C. under pressurization at 100 K/G for 600 seconds at 25° C. The cooling rate is controlled by intervening the mold between thick papers. After cooling, a press sheet taken out is used as a press plate for measuring haze.

In the invention, transparency of the resulting ultrahigh-molecular-weight ethylene copolymer powder can be controlled by the density of the ultrahigh-molecular-weight ethylene copolymer powder. In the invention, the density of the ultrahigh-molecular-weight ethylene copolymer powder can be controlled by changing comonomer concentration relative to ethylene in the polymer vessel. Specifically, the density of the ultrahigh-molecular-weight ethylene copolymer powder is lowered by increasing the comonomer concentration relative to ethylene in the polymerization vessel and thereby, the transparency of the ultrahigh-molecular-weight ethylene copolymer powder is improved.

The bulk density of the ultrahigh-molecular-weight ethylene copolymer powder of the invention is obtained by measuring bulk density of the copolymer powder washed with hexane and methanol and dried at 90° C. for 1 hour, in accordance with JIS K-6721. The bulk density of the ultrahigh-molecular-weight ethylene copolymer powder of the invention is from 0.35 g/cm³ to 0.60 g/cm³, preferably from 0.40 g/cm³ to 0.55 g/cm³. When the bulk density is less than 0.35 g/cm³, the bulk density is too low and there arise problems that a sufficient weight of the ultrahigh-molecular-weight ethylene copolymer powder for a molded article can not charged at filling the mold and bubbles are apt to be present in the molded articles. A powder having a bulk density exceeding 0.60 g/cm³ may possibly show a decreased powder flowability and hence is not preferred.

In the invention, a method of controlling molecular weight of the resulting ultrahigh-molecular-weight ethylene copolymer powder is not particularly limited but, for example, the bulk density can be controlled by slurry concentration in the polymerization system and productivity of the ultrahigh-molecular-weight ethylene copolymer powder per catalyst. In the invention, the productivity of the ultrahigh-molecular-weight ethylene copolymer powder per catalyst is represented by the amount in g of the ultrahigh-molecular-weight ethylene copolymer powder to be produced per g of catalyst. Specifically, the bulk density can be increased by increasing the slurry concentration. Moreover, the bulk density can be increased by increasing the productivity of the ultrahigh-molecular-weight ethylene copolymer powder per catalyst.

The ultrahigh-molecular-weight ethylene copolymer powder of the invention preferably has a density ($\rho$ (g/cm³)) measured according to ASTM D1505 of 0.900 to 0.940. In this invention, the press sheet used for haze measurement was annealed at 120° C. for 1 hour and further cooled at 25° C. for 1 hour, whereby a sample for density measurement was prepared.

Next, the method for producing the ultrahigh-molecular-weight ethylene copolymer powder of the invention will be described.

The catalyst for producing the ultrahigh-molecular-weight ethylene copolymer powder of the invention is not particularly limited but it is preferred to use the catalyst described below.

The catalyst comprises a solid catalyst component [A] and an organometallic compound component [B]. The solid catalyst component [A] is obtained by supporting a titanium compound on a support (A-1) prepared by a reaction of an organic magnesium compound represented by the below-shown general formula 1 soluble in an inert hydrocarbon solvent with a chlorinating agent represented by the below-shown general formula 2. It is necessary to carry out the reaction of the organic magnesium compound with the chlorinating agent at a temperature of 60° C. to 150° C. Since the rate of the reaction of the organic magnesium compound with the chlorinating agent is too low at a temperature lower than 60° C., cohesive strength of a solid formed by the reaction becomes low and the bulk density of the solid catalyst component [A] decreases, so that the bulk density of the ultrahigh-molecular-weight ethylene copolymer powder produced in the presence of the solid catalyst component [A] remarkably decreases. Since the rate of the reaction of the organic magnesium compound with the chlorinating agent is too high at a temperature higher than 150° C., the aggregated structure of the solid formed by the reaction becomes irregular and the form of the solid becomes uneven, so that the bulk density of the solid catalyst component [A] decreases and hence the bulk density of the ultrahigh-molecular-weight ethylene copolymer powder produced in the presence of the solid catalyst component [A] remarkably decreases.

The support (A-1) of the solid catalyst component [A] of the catalyst is synthesized by the reaction of an organomagnesium compound represented by the below-shown general formula 1 soluble in an inert hydrocarbon solvent with a chlorinating agent represented by the below-shown general formula 2.

The organomagnesium compound used at the synthesis of (A-1) is represented by the following formula 1:

$$(M^1)_\alpha (Mg)_\beta (R^2)_a (R^3)_b (OR^4)_c \qquad \text{formula 1}$$

wherein $M^1$ is a metal atom belonging to the group consisting of Group 1, Group 2, Group 12, and Group 13 of the periodic table except magnesium, $R^2$, $R^3$, and $R^4$ each is a hydrocarbon group having 2 to 20 carbon atoms, and $\alpha$, $\beta$, a, b, and c each is a real number satisfying the following relations: $0 \leq \alpha$, $0 < \beta$, $0 \leq a$, $0 \leq c$, $0 < a+b$, $0 \leq c/(\alpha+\beta) \leq 2$, $k\alpha+2\beta = a+b+c$ (wherein k is an atomic valency of $M^1$).

The compound is shown in the form of a complex compound of organomagnesium soluble in an inert hydrocarbon solvent but includes dihydrocarbylmagnesium compounds and any complexes of the compounds with other metallic compounds. The relational formula $k\alpha+2\beta = a+b+c$ of the symbols $\alpha$, $\beta$, a, b, and c represents stoichiometry between the atomic valency of a metal atom and a substituent.

In the formula, the hydrocarbons represented by $R^2$ and $R^3$ each is an alkyl group, a cycloalkyl group, or an aryl group and examples thereof include methyl, ethyl, propyl, butyl, propyl, hexyl, octyl, decyl, cyclohexyl, and phenyl groups. Preferably, $R^2$ and $R^3$ each is an alkyl group. In the case that $\alpha$ is larger than 0, as the metal atom $M^1$, a metal atom belonging to the group consisting of Group 1, Group 2, Group 12, and Group 13 of the periodic table except magnesium can be used. Examples thereof include lithium, sodium, potassium, beryllium, zinc, boron, and aluminum and particularly preferred are aluminum, boron, beryllium, and zinc.

The ratio $\beta/\alpha$ of magnesium to the metal atom $M^1$ can be optionally set and is in the range of preferably from 0.1 to 30, particularly from 0.5 to 10. Moreover, in the case that a certain kind of the organomagnesium compound wherein $\alpha$ is 0 is used, for example, in the case that $R^2$ is 1-methylpropyl or the like, the compound is soluble in an inert hydrocarbon solvent and such a compound also gives a preferable result in the invention. In the general formula 1, it is recommended that $R^2$ and $R^3$ in the case that $\alpha$ is 0 each is any one of the following groups (1), (2), (3):

(1) at least one of $R^2$ and $R^3$ is a secondary or tertiary alkyl group having 4 to 6 carbon atoms, preferably both of $R^2$ and $R^3$ have 4 to 6 carbon atoms and at least one thereof is a secondary or tertiary alkyl group;

(2) $R^2$ and $R^3$ are alkyl groups each different in number of carbon atoms, preferably $R^2$ is an alkyl group having 2 or 3 carbon atoms and $R^3$ is an alkyl group having 4 or more carbon atoms;

(3) at least one of $R^2$ and $R^3$ is a hydrocarbon group having 6 or more carbon atoms, preferably they are alkyl groups wherein the number of the carbon atoms contained in $R^2$ and $R^3$ is 12 or more in total.

The following will specifically describe these groups. In the above (1), as the secondary or tertiary alkyl group having 4 to 6 carbon atoms, there may be used 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, 2-methyl-2-ethylpropyl, and the like groups and particularly preferred is a 1-methylpropyl group. Moreover, in the above (2), as the alkyl group having 2 or 3 carbon atoms, there may be mentioned ethyl, 1-methylethyl, propyl, and the like groups and particularly preferred is an ethyl group. As the alkyl group having 4 or more carbon atoms, there may be mentioned butyl, pentyl, hexyl, heptyl, octyl, and the like groups and particularly preferred are butyl and hexyl groups.

Furthermore, in the above (3), as the hydrocarbon group having 6 or more carbon atoms, there may be mentioned hexyl, heptyl, octyl, nonyl, decyl, phenyl, 2-naphthyl, and the like groups. Among the hydrocarbon groups, alkyl groups are preferred and hexyl and octyl groups are particularly preferred among the alkyl groups. In general, when the number of carbon atoms contained in an alkyl group increases, the compound tends to be dissolved in an inert hydrocarbon solvent but it is not preferred to use an alkyl group having an unduly long chain since solution viscosity increases. In this regard, the above organomagnesium compound is used as an inert hydrocarbon solution but the solution can be used with no trouble even when a minute amount of Lewis basic compounds such as an ether, an ester, and an amine are contained in the solution.

The following will describe the alkoxy group ($OR^4$). The hydrocarbon group represented by $R^4$ is preferably an alkyl group having 1 to 12 carbon atoms or an aryl group, particularly preferably an alkyl group having 3 to 10 carbon atoms or an aryl group. Specifically, examples thereof include methyl, ethyl, propyl, 1-methylethyl, butyl, 1-methylpropyl, 1,1-dimethyletyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, naphthyl, and the like groups and particularly preferred are butyl, 1-methylpropyl, 2-methylpentyl, and 2-ethylhexyl groups.

The organomagnesium compound is synthesized by the method of reacting an organomagnesium compound belonging to the group consisting of general formulae $R_2MgX$ and $R^2{}_2Mg$ (wherein $R_2$ has a meaning as described above and X is a halogen atom) with an organometallic compounds belonging to the group consisting of general formulae $M^1R^3{}_k$ and $M^1R^3{}_{(k-1)}H$ (wherein $M^1$, $R^3$, and k have meanings as described above) in an inert hydrocarbon solvent at a temperature between room temperature and 150° C., if necessary, followed by a reaction with an alcohol having a hydrocarbon group represented by $R^4$ or an alkoxymagnesium compound and/or alkoxyaluminum compound having a hydrocarbon group represented by the above $R^4$ soluble in the inert hydrocarbon solvent.

In the method, in the case of reacting the organomagnesium compound soluble in an inert hydrocarbon solvent with an alcohol, as an order of the reaction, any of a method of adding the alcohol to the organomagnesium compound, a method of adding the organomagnesium compound into the alcohol, and a method of adding both compounds simultaneously can be used. In the invention, the reaction ratio of the organomagnesium compound soluble in an inert hydrocarbon solvent to the alcohol is not particularly limited but the range of the molar compositional ratio $c/(\alpha+\beta)$ of the alkoxy group to the total metal atoms in the resulting alkoxy group-containing organomagnesium compound as a result of the reaction is $0 \leq c/(\alpha+\beta) \leq 2$, particularly preferably $0 \leq c/(\alpha+\beta) < 1$.

The chlorinating agent to be used in the synthesis of (A-1) is a chlorinated silicon compound having at least one Si—H bond represented by the following formula:

$$H_d SiCl_e R^5{}_{(4-(d+e))} \qquad \text{formula 2}$$

wherein $R^5$ is a hydrocarbon group having 1 to 12 carbon atoms and d and e each is an real number satisfying the following relations: $0<d$, $0<e$, $0<d+e \leq 4$. In the above formula, the hydrocarbon group represented by $R^5$ is an aliphatic hydrocarbon group, an alicyclic hydrocarbon group, or an aromatic hydrocarbon group and examples thereof include methyl, ethyl, propyl, 1-methylethyl, butyl, pentyl, hexyl, octyl, decyl, cyclohexyl, phenyl, and the like groups. Preferred is an alkyl group having 1 to 10 alkyl group and particularly preferred is an alkyl group having 1 to 3 carbon atoms, such as methyl, ethyl, propyl, or 1-methylethyl group. Moreover, d and e each is a number larger than 0 which satisfies the relation of $d+e \leq 4$ and e is particularly preferably 2 or 3.

As these compounds, there may be mentioned $HSiCl_3$, $HSiCl_2CH_3$, $HSiCl_2C_2H_5$, $HSiCl_2 (C_3H_7)$, $HSiCl_2 (2\text{-}C_3H_7)$, $HSiCl_2(C_4H_9)$, $HSiCl_2(C_6H_5)$, $HSiCl_2(4\text{-Cl} —C_6H_5)$, $HSiCl_2(CH=CH_2)$, $HSiCl_2 (CH_2C_6H_5)$, $HSiCl_2 (1\text{-}C_{10}H_7)$, $HSiCl_2 (CH_2CH=CH_2)$, $H_2SiCl(CH_3)$, $H_2SiCl(C_2H_5)$, $HSiCl(CH_3)_2$, $HSiCl (C_2H_5)_2$, $HSiCl (CH_3) (2\text{-}C_3H_7)$, $HSiCl (CH_3) (C_6H_5)$, $HSiCl (C_6H_5)_2$, and the like, and a chlorinated silicon compound selected from these compounds or mixtures of two or more compounds selected from these compounds can be used. As the chlorinated silicon compounds, preferred are trichlorosilane, monomethyldichlorosilane, dimethylchlorosilane, and ethyldichlorosilane and particularly preferred are trichlorosilane and monomethyldichlorosilane.

As the inert hydrocarbon solvent in the invention, there may be mentioned aliphatic hydrocarbons such as pentane, hexane, and heptane, aromatic hydrocarbons such as benzene and toluene, and alicyclic hydrocarbons such as cyclohexane and methylcyclohexane.

The following will describe the reaction of the organomagnesium compound with the chlorinated silicon compound. At the reaction, the chlorinated silicon compound is preferably used after diluting it with the inert hydrocarbon solvent, a chlorinated hydrocarbon such as 1,2-dichloroethane, o-dichlorobenzene, or dichloromethane, an ether-based medium such as diethyl ether or tetrahydrofuran, or a mixed medium of them. In particular, the inert hydrocarbon solvent is preferred in view of performance of the catalyst. The reaction ratio of the organomagnesium compound to the chlorinated silicon compound is not particularly limited but is in the range of usually from 0.01 to 100 mol of the chlorinated silicon compound relative to 1 mol of the organomagnesium compound, preferably from 0.1 to 10 mol of the chlorinated silicon compound relative to 1 mol of the organomagnesium compound.

As methods for the reaction, there may be a method of simultaneous addition wherein the organomagnesium compound and the chlorinated silicon compound are simultaneously introduced into a reactor and reacted, a method of charging the chlorinated silicon compound into a reactor beforehand and then the organomagnesium compound is introduced into the reactor, a method of charging the organomagnesium compound into a reactor beforehand and then the chlorinated silicon compound is introduced into the reactor, or the like but the method of charging the chlorinated silicon compound into a reactor beforehand and then the organomagnesium compound is introduced into the reactor is preferred. After a solid component obtained by the above reaction is separated by filtration or decantation, it is preferred to thoroughly wash the component with the inert hydrocarbon solvent to remove unreacted matter or by-products.

The reaction temperature is from 60° C. to 150° C., preferably from 65° C. to 150° C., more preferably from 70° C. to 150° C. When the temperature is from 60° C. to 150° C., a highly active catalyst is obtained since the reaction of the organomagnesium compound with the chlorinated silicon compound rapidly proceeds, and a polyolefin powder obtained by olefin polymerization using the catalyst has a high bulk density. In the method of simultaneous addition wherein the organomagnesium compound and the chlorinated silicon compound are simultaneously introduced into a reactor and reacted, the reaction temperature is controlled at a predetermined temperature by controlling the temperature of the reactor at the predetermined temperature beforehand and controlling the temperature in the reactor at the predetermined temperature with simultaneous addition. In the method of charging the chlorinated silicon compound into a reactor beforehand and then the organomagnesium compound is introduced into the reactor, the reaction temperature is controlled at a predetermined temperature by controlling the temperature of the reactor into which the chlorinated silicon compound has been charged at the predetermined temperature and controlling the temperature in the reactor at the predetermined temperature with introducing the organomagnesium compound into the reactor. In the method of charging the organomagnesium compound into a reactor beforehand and then the chlorinated silicon compound is introduced into the reactor, the reaction temperature is controlled at a predetermined temperature by controlling the temperature of the reactor into which the organomagnesium compound has been charged at the predetermined temperature and controlling the temperature in the reactor at the predetermined temperature with introducing the chlorinated silicon compound into the reactor.

The reaction of the organomagnesium compound with the chlorinated silicon compound can also be carried out in the presence of a solid. The solid may be any of an inorganic solid or an organic solid but an inorganic solid is preferred. As the inorganic solid, the following may be mentioned:
(i) inorganic oxides;
(ii) inorganic carbonates, silicates, and sulfates;
(iii) inorganic hydroxides;
(iv) inorganic halides; and
(v) complex salts, solid solutions or mixtures, comprising (i) to (iv).

Specific examples of the inorganic solid include silica, alumina, silica/alumina, hydrated alumina, magnesia, thoria, titania, zirconia, calcium phosphate-barium sulfate, calcium sulfate, magnesium silicate, magnesium-calcium, aluminum silicate [(Mg.Ca)O.Al$_2$O$_3$.5SiO$_2$.nH$_2$O], potassium.aluminum silicate [K$_2$O.3Al$_2$O$_3$.6SiO$_2$.2H$_2$O], magnesium iron silicate [(Mg.Fe) 2SiO$_4$], aluminum silicate [Al$_2$O$_3$.SiO$_2$], calcium carbonate, magnesium chloride, and magnesium iodide. Particularly, silica, silica-alumina, or magnesium chloride is preferred. The specific surface area of the inorganic solid is preferably 20 m$^2$/g or more, particularly preferably 90 m$^2$/g or more.

The following will describe the titanium compound (A-2).

As the titanium compound (A-2), a titanium compound represented by the following formula 3 is preferred.

$$\text{Ti(OR}^6)_f X_{(4-f)} \qquad \text{formula 3}$$

wherein f is a real number of 0 to 4, R$^6$ is a hydrocarbon group having 1 to 20 carbon atoms, and X is a halogen atom.

As the hydrocarbon group represented by R$^6$, there may be mentioned aliphatic hydrocarbon groups such as methyl, ethyl, propyl, butyl, pentyl, hexyl, 2-ethylhexyl, heptyl, octyl, decyl, and allyl groups, alicyclic hydrocarbon groups such as cyclohexyl, 2-methylcyclohexyl, and cyclopentyl groups, aryl hydrocarbon groups such as phenyl and naphthyl groups, and the like but preferred are aliphatic hydrocarbon groups. As the halogen represented by X, there may be mentioned chlorine, bromine, iodine, and the like but preferred is chlorine. It is possible to use a mixture of two or more of the compounds (A-2) selected from the above.

The amount of (A-2) is preferably from 0.01 to 20, particularly preferably from 0.05 to 10 as a molar ratio thereof to the magnesium atom contained in the solid component. The reaction temperature is not particularly limited but the reaction is preferably carried out in the range of 25° C. to 150° C.

In the invention, a method for supporting the titanium compound (A-2) on the support (A-1) is not particularly limited and there may be mentioned a method of reacting the titanium compound in an excessive amount relative to the support (A-1) or a method of effectively supporting the titanium compound by using a third component but, in particular, preferred is a method of supporting by the reaction of the titanium compound (A-2) with the organometallic compound (A-3).

The following will describe the organometallic compound (A-3). As (A-3), preferred is a compound represented by the following general formula 4:

$$(M^2)_\gamma (Mg)_\epsilon (R^7)_h (R^8)_i Y_j \qquad \text{formula 4}$$

wherein M$^2$ is a metal atom belonging to the group consisting of Group 1, Group 2, Group 12, and Group 13 of the periodic table except magnesium, R$^7$ and R$^8$ each is a hydrocarbon group having 2 to 20 carbon atoms, Y is an alkoxy, siloxyl, allyloxy, amino, amido, —N=C—$R^9$, $R^{10}$, —$SR^{11}$ (wherein $R^9$, $R^{10}$, and $R^{11}$ each is a hydrocarbon group having 2 to 20 carbon atoms), and a β-keto acid residue, and γ, ε, h, i, and j each is a real number satisfying the following relations: $0 \leq \gamma$, $0 < \epsilon$, $0 \leq h$, $0 \leq i$, $0 < h+i$, $0 \leq j/(\gamma+\epsilon) \leq 2$, $n\gamma + 2\epsilon = a+b+c$ (wherein n is an atomic valency of $M^2$).

The compound is shown in the form of a complex compound of the organomagnesium soluble in an inert hydrocarbon solvent but includes dihydrocarbylmagnesium compounds and any complexes of the compounds with other metallic compounds. The relational formula $n\gamma+2\epsilon=h+i+j$ of the symbols γ, ε, h, i, and j represents stoichiometry between the atomic valency of the metal atoms and a substituent.

In the formula, the hydrocarbons represented by $R^7$, $R^8$, $R^9$, $R^{10}$, and $R^{11}$ each is an alkyl group, a cycloalkyl group, or an aryl group and examples thereof include methyl, ethyl, propyl, butyl, pentyl, hexyl, octyl, decyl, cyclohexyl, and phenyl groups. Preferably, $R^7$, $R^8$, $R^9$, $R^{10}$, and $R^{11}$ each is an alkyl group. In the case that γ is larger than 0, as the metal atom $M^2$, a metal atom belonging to the group consisting of Group 1, Group 2, Group 12, and Group 13 of the periodic table except magnesium can be used. Examples thereof include lithium, sodium, potassium, beryllium, zinc, boron, and aluminum and particularly preferred are aluminum, boron, beryllium, and zinc.

The ratio ε/γ of magnesium to the metal atom $M^2$ can be optionally set and is preferably in the range of 0.1 to 30, particularly from 0.5 to 10. Moreover, in the case that a certain kind of an organomagnesium compound wherein γ is 0 is used, for example, in the case that $R^7$ is 1-methylpropyl or the like, the compound is soluble in the inert hydrocarbon solvent and such a compound also gives a preferable result in the invention. In the general formula $(M^2)_\gamma(Mg)_\epsilon(R^7)_h(R^8)_iY_j$, it is recommended that $R^7$ and $R^8$ in the case that γ is 0 each is any one of the following groups (1), (2), (3):

(1) at least one of $R^7$ and $R^8$ is a secondary or tertiary alkyl group having 4 to 6 carbon atoms, preferably both of $R^7$ and $R^8$ have 4 to 6 carbon atoms and at least one thereof is a secondary or tertiary alkyl group;

(2) $R^7$ and $R^8$ are alkyl groups each different in number of carbon atoms, preferably $R^7$ is an alkyl group having 2 or 3 carbon atoms and $R^8$ is an alkyl group having 4 or more carbon atoms;

(3) at least one of $R^7$ and $R^8$ is a hydrocarbon group having 6 or more carbon atoms, preferably they are alkyl groups wherein the number of the carbon atoms contained in $R^7$ and $R^8$ is 12 or more in total.

The following will specifically describe these groups. In the above (1), as the secondary or tertiary alkyl group having 4 to 6 carbon atoms, there may be used 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, 2-methyl-2-ethylpropyl, and the like groups and particularly preferred is a 1-methylpropyl group. Moreover, in the above (2), as the alkyl group having 2 or 3 carbon atoms, there may be mentioned ethyl, 1-methylethyl, propyl, and the like groups and particularly preferred is an ethyl group. As the alkyl group having 4 or more carbon atoms, there may be mentioned butyl, pentyl, hexyl, heptyl, octyl, and the like groups and particularly preferred are butyl and hexyl groups.

Furthermore, in the above (3), as the hydrocarbon group having 6 or more carbon atoms, there may be mentioned hexyl, heptyl, octyl, nonyl, decyl, phenyl, 2-naphthyl, and the like groups. Among the hydrocarbon groups, alkyl groups are preferred and hexyl and octyl groups are particularly preferred among the alkyl groups. In general, when the number of carbon atoms contained in an alkyl group increases, the compound tends to be dissolved in the inert hydrocarbon solvent but it is not preferred to use an alkyl group having an unduly long chain since solution viscosity increases. In this regard, the above organomagnesium compound is used as an inert hydrocarbon solution but the solution can be used with no trouble even when a minute amount of Lewis basic compounds such as an ether, an ester, and an amine.

The following will describe Y. Y is an alkoxy, siloxyl, allyloxy, amino, amido, —N=C—$R^9$, $R^{10}$, —$SR^{11}$ (wherein $R^9$, $R^{10}$, and $R^{11}$ each independently represents a hydrocarbon group having 2 to 20 carbon atoms).

The hydrocarbon group represented by $R^9$ is preferably an alkyl group having 1 to 12 carbon atoms or an aryl group, particularly preferably an alkyl group having 3 to 10 carbon atoms or an aryl group. Specifically, examples thereof include methyl, ethyl, propyl, 1-methylethyl, butyl, 1-methylpropyl, 1,1-dimethyletyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups and particularly preferred are butyl, 1-methylpropyl, 2-methylpentyl, and 2-ethylhexyl groups.

The organomagnesium compound is synthesized by a method of reacting an organomagnesium compound belonging to the group consisting of general formulae $R^7MgX$ and $R^7_2Mg$ (wherein $R^7$ has a meaning as described above and X is a halogen atom) with an organometallic compounds belonging to the group consisting of general formulae $M^2R^8_n$ and $M^2R^8_{(n-1)}H$ (wherein $M^2$ and $R^8$ have meanings as described above and n is an atomic valency of $M^2$) in an inert hydrocarbon solvent at a temperature of 25° C. to 150° C., if necessary, followed by the reaction with an alcohol having a hydrocarbon group represented by $R^4$ or an alkoxymagnesium compound and/or an alkoxyaluminum compound having a hydrocarbon group represented by the above $R^4$ soluble in the inert hydrocarbon solvent.

In the method, in the case of reacting the organomagnesium compound soluble in the inert hydrocarbon solvent with an alcohol, as an order of the reaction, any of a method of adding the alcohol to the organomagnesium compound, a method of adding the organomagnesium compound into the alcohol, and a method of adding both compounds simultaneously can be used. In the invention, the reaction ratio of the organomagnesium compound soluble in the inert hydrocarbon solvent to the alcohol is not particularly limited but the range of the molar compositional ratio $c/(\gamma+\epsilon)$ of the alkoxy group to the total metal atoms in the resulting alkoxy group-containing organomagnesium compound as a result of the reaction is $0 \leq c/(\gamma+\epsilon) \leq 2$, particularly preferably $0 \leq c/(\gamma+\epsilon) < 1$.

The amount of (A-3) to be used is preferably from 0.01 to 20, particularly preferably from 0.05 to 10 as a molar ratio of Mg contained in (A-3) relative to magnesium contained in the solid component. The reaction temperature is not particularly limited but is carried out preferably in the range of −80° C. to 150° C., more preferably in the range of −40° C. to 100° C. As an order of adding (A-2) and (A-3), any of a method of adding (A-2) and subsequently (A-3), a method of adding (A-3) and subsequently (A-2), and a method of adding (A-2) and (A-3) simultaneously but preferred is a method of adding (A-2) and (A-3) simultaneously. The molar ratio of (A-3) to (A-2) is preferably in the range of 0.1 to 10, more preferably in the range of 0.5 to 5. The reaction between (A-2) and (A-3) is carried out in the inert hydrocarbon solvent but it is preferred to use an aliphatic hydrocarbon solvent such as hexane or heptane.

The catalyst thus obtained is used as a slurry solution using the inert hydrocarbon solvent.

The solid catalyst component [A] of the invention is converted into a more active polymerization catalyst by combining it with an organometallic compound component [B]. The organometallic compound component [B] is preferably a compound containing a metal belonging to the group consisting of Group 1, Group 2, and Group 13 of the periodic table, particularly preferably an organoaluminum compound and/or an organomagnesium compound.

As the organoaluminum compound, it is preferred to use a compound represented by the general formula $AlR^{12}_p Z_{(3-p)}$ (wherein $R^{12}$ is a hydrocarbon group having 1 to 20 carbon atoms, Z is a group selected from the group consisting of hydrogen, halogen, alkoxy, allyloxy, and siloxy groups, and p is a number of 2 to 3) singly or as a mixture. In the above formula, the hydrocarbon group having 1 to 20 carbon atoms represented by $R^{12}$ includes aliphatic hydrocarbons, aromatic hydrocarbons, and alicyclic hydrocarbons and, for example, preferred are trialkylaluminum compounds such as trimethylaluminum, triethylaluminum, tripropylaluminum, tributylaluminum, tri(2-methylpropyl)aluminum, tripentylaluminum, tri(3-methylbutyl)aluminum, trihexylaluminum, trioctylaluminum, and tridecylaluminum, halogenated aluminum compounds such as diethylaluminum chloride, ethylaluminum dichloride, di(2-methylpropyl)aluminum chloride, ethylaluminum sesquichloride, and diethylaluminum bromide, alkoxyaluminum compounds such as diethylaluminum ethoxide and di(2-methylpropyl)aluminum butoxide, siloxyaluminum compounds such as dimethylhydrosiloxyaluminum dimethyl, ethylmethylhydrosiloxyaluminum diethyl, and ethyldimethylsiloxyaluminum diethyl, and mixtures thereof and particularly preferred are trialkylaluminum compounds.

As the organomagnesium compound, the above compound represented by the general formula 1 is preferred:

$$(M^1)_\alpha (Mg)_\beta (R^2)_a (R^3)_b (OR^4)_c \qquad \text{formula 1}$$

wherein $M^1$ is a metal atom belonging to the group consisting of Group 1, Group 2, Group 12, and Group 13 of the periodic table except magnesium, $R^2$, $R^3$, and $R^4$ each is a hydrocarbon group having 2 to 20 carbon atoms, and $\alpha$, $\beta$, a, b, and c each is a real number satisfying the following relations: $0 \leq \alpha$, $0 < \beta$, $0 \leq a$, $0 \leq c$, $0 < a+b$, $0 \leq c/(\alpha+\beta) \leq 2$, $k\alpha + 2\beta = a+b+c$ (wherein k is an atomic valency of $M^1$).

The compound is shown in the form of a complex compound of organomagnesium soluble in an inert hydrocarbon solvent but includes dihydrocarbylmagnesium compounds and any complexes of the compounds with other metallic compounds. $\alpha$, $\beta$, a, b, c, $M^1$, $R^2$, $R^3$ and $OR^4$ are as described above. Since a compound soluble in the inert hydrocarbon solvent is desirable, the ratio $\beta/\alpha$ is preferably in the range of 0.5 to 10 and a compound wherein $M^1$ is aluminum is further preferred.

The solid catalyst component [A] and the organometallic compound component [B] may be added into a polymerization system under polymerization conditions or may be combined beforehand prior to polymerization. Moreover, the ratio of both components to be combined is preferably in the range of 1 to 3000 mmol of the organometallic compound component [B] relative to 1 g of the solid catalyst component [A].

The ultrahigh-molecular-weight ethylene copolymer powder of the invention can be produced by copolymerizing ethylene by a suspension polymerization process or a gas-phase polymerization process. In the suspension polymerization process, an inert hydrocarbon medium can be used as a medium and an olefin itself can be used as a solvent.

As such an inert hydrocarbon medium, there may be mentioned aliphatic hydrocarbons such as propane, butane, isobutane, pentane, isopentane, hexane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

The polymerization temperature in the production process of the invention is usually preferably 50° C. or higher, more preferably 60° C. or higher, even more preferably 70° C., or higher and is preferably 100° C. or lower, more preferably 85° C. or lower.

The polymerization pressure is usually preferably from normal pressure to 2 MPa, more preferably from 0.1 MPa to 1.5 MPa, even more preferably from 0.1 MPa to 1.0 MPa. The polymerization reaction can be carried out in any of batch-wise, semi-continuous, and continuous methods.

Moreover, it is also possible to carry out the polymerization separately into two or more steps wherein reaction conditions are different. Furthermore, as described in German Patent Laid-Open No. 3127133, the molecular weight of the resulting olefin polymer can be also controlled by incorporating hydrogen in the polymerization system or changing the polymerization temperature. In this regard, in the invention, the other component(s) useful for the production of the ultrahigh-molecular-weight ethylene copolymer other than the above individual components may be incorporated.

Since the ultrahigh-molecular-weight polyethylene having a viscosity-average molecular weight exceeding 1,000,000 is excellent in abrasion resistance, low friction, and strength, it has an characteristic that it is also suitable as a material for sliding members such as gear, bearing members, artificial joint substitutes, sole material for skis, polishing materials, slip sheets for various magnetic tapes, liners for flexible discs, bulletproof members, battery separators, various filters, foams, films, pipes, fibers, threads, fishing lines, cutting boards, and the like. Moreover, since the ultrahigh-molecular-weight ethylene copolymer powder is excellent in not only low friction but also flexibility and transparency, it is particularly suitable as sole materials for skis or snowboards. Furthermore, since it has a high strength (impact resistance and stabbing strength) as compared with usual ultrahigh-molecular-weight polyethylene, the powder is suitably used for battery separators and filters.

The ultrahigh-molecular-weight ethylene copolymer powder of the invention can be molded using the same molding method as in the case of usual ultrahigh-molecular-weight polyethylene. For example, a molded article of the ultrahigh-molecular-weight ethylene copolymer powder of the invention can be obtained by a method of charging the ultrahigh-molecular-weight polyethylene powder into a mold and subjecting it to compression molding under heating for a long period of time or by various known molding methods such as an extrusion molding by means of a ram extruder.

Moreover, the molded articles of the ultrahigh-molecular-weight ethylene copolymer powder of the invention include microporous films obtainable by mixing the ultrahigh-molecular-weight ethylene copolymer powder with a suitable solvent or plasticizer, extruding the mixture into a film shape, stretching it, and extracting the solvent or plasticizer used. The film can be used as a battery separator. In this case, a film mixed with an inorganic material such as silica can be also formed.

Furthermore, a high-strength fiber having an ultrahigh elastic modulus can be obtained by dissolving the ultrahigh-molecular-weight ethylene copolymer powder of the invention in a suitable solvent or plasticizer or mixing it with a suitable solvent or plasticizer to prepare a gel-like mixture and subjecting it to a known gel-spinning technology.

EXAMPLES

The following will describe the invention with reference to Examples and Comparative Examples but the invention is by no means limited thereto.

[Measurement of Viscosity-Average Molecular Weight (Mv)]

Into 20 ml of decalin was added 20 mg of a polymer, followed by 2 hours of stirring at 150° C. to dissolve the polymer. A dropping time ($t_s$) of the solution between gauge marks was measured using an Ubbelohde-type viscometer in a high-temperature bath of 135° C. In this regard, the dropping time ($t_b$) of decahydronaphthalene alone in which no polymer was added was measured as a blank. According to the following formula, specific viscosity ($\eta_{sp}/C$) of the polymer was plotted and intrinsic viscosity ($\eta$) was determined by extrapolation to concentration of 0.

$$\eta_{sp}/C=(T_s/t_b-1)/0.1$$

According to the following formula, a viscosity-average molecular weight (Mv) was determined from the $\eta$ value.

$$Mv=(5.34\times10^4)\times\eta^{1.49}$$

[Preparation of Press Sheet]

Using a mold having a size of 60 mm×60 mm and a thickness of 2 mm, a press sheet was prepared by pressing an ultrahigh-molecular-weight ethylene copolymer in accordance with ASTM D1928 Procedure C. First, an aluminum plate having a thickness of 0.1 mm was placed on a smooth iron plate having a thickness of 5 mm and further a polyethylene terephthalate film (manufactured by Toray Industries, Inc., Lumirror) having a thickness of 50 μm which was not coated with cellophane was placed thereon. The mold having a size of 60 mm×60 mm and a thickness of 2 mm was placed thereon and 8 g of the ultrahigh-molecular-weight ethylene copolymer was charged therein. The above polyethylene terephthalate film was placed thereon, the above aluminum plate was further placed, and finally the above iron plate was placed thereon. The whole was placed in a compression-molding machine (manufactured by Sinto Metal Industries Ltd., SFA-37) whose temperature had been controlled at 190° C., heated at 190° C. for 900 seconds, and then air was released for 5 seconds (100 K/G), followed by pressurization at 200 K/G for 300 seconds. After pressurization, the sample was taken out and, after 5 seconds, it was placed in a compression-molding machine (manufactured by Sinto Metal Industries Ltd., SFA-37) whose temperature had been controlled at 25° C., and cooled at a cooling rate of 15±2° C./minute under pressurization at 100 K/G at 25° C. for 600 seconds. The cooling rate was controlled by intervening the mold between thick papers. After cooling, the press sheet taken out was used for measurement of haze and density.

[Measurement of Haze]

Haze was measured by the method of ASTM D 1003 using the above press plate as a test piece. <Measuring instrument: Grade Name HM-100 manufactured by Murakami Color Research Laboratory), size of the sample: 50(W)*10(t)*50 (h) mm, Optical system: in accordance with ASTM D 1003>

[Measurement of Bulk Density]

With regard to bulk density, after the copolymer powder was washed with hexane and methanol, bulk density of the powder dried at 90° C. for 1 hour was measured in accordance with JIS K-6721. The washing with hexane was carried out by adding 2000 mL of hexane at 25° C. to 100 g of the powder to form a slurry, allowing it to stand after thorough stirring, removing 1500 mL of supernatant after precipitation of the powder, and filtering the resulting slurry though a 300 mesh woven metal wire to separate the powder. The washing with methanol was carried out by conducting the same operation as in washing with hexane except that methanol was used instead of hexane for 100 g of the powder after washing with hexane.

[Measurement of Density]

Density was measured in accordance with ASTM D 1505. As a test piece, a piece which had been carved out of the above press sheet, annealed at 120° C. for 1 hour, and then cooled at 25° C. for 1 hour was used.

Referential Example 1

Solid Catalyst 1

(1) Synthesis of Support (A-1)

Into an 8 L stainless autoclave thoroughly replaced with nitrogen was charged 1460 mL of a 2 mol/L hexane solution of hydroxytrichlorosilane. Under stirring at 80° C., 3730 mL of a hexane solution of an organomagnesium compound represented by the compositional formula $AlMg_5(C_4H_9)_{11}(OC_3H_7)_2$ (corresponding to 2.68 mol of magnesium) was added dropwise over a period of 4 hours and the reaction was continued under another 1 hour of stirring at 80° C. After completion of the reaction, the supernatant was removed and the residue was washed four times with 2600 mL of hexane. As a result of analyzing the solid, magnesium contained in 1 g of the solid was found to be 8.43 mmol.

(2) Preparation of Solid Catalyst Component [A-1]

To 2880 mL of a hexane slurry containing 160 g of the above support were added 160 mL of a 1 mol/L hexane solution of titanium tetrachloride and 160 mL of a 1 mol/L hexane solution of an organomagnesium compound represented by the compositional formula $AlMg_5(C_4H_9)_{11}(OC_3H_7)_2$ simultaneously over a period of 1 hour. After the addition, the reaction was continued at 20° C. for 1 hour. After completion of the reaction, 1600 mL of supernatant was removed and the residue was washed twice with 1600 mL of hexane to prepare a solid catalyst component [A-1]. The amounts of titanium and chlorine contained in 1 g of the solid catalyst component were found to be 0.98 mmol and 14.9 mmol, respectively.

Solid Catalyst 2

Comparative Example (1) Preparation of Solid Catalyst Component [A-2]

In the preparation of the solid catalyst component [A], to an 8 L stainless autoclave thoroughly replaced with nitrogen was added 1600 mL of hexane. Under stirring at 20° C., thereto were added 800 mL of a 1 mol/L hexane solution of titanium tetrachloride and 800 mL of a 1 mol/L hexane solution of an organomagnesium compound represented by the compositional formula $AlMg_5(C_4H_9)_{11}(C_3H_7)_2$ simultaneously over a period of 1 hour. After the addition, temperature was slowly elevated and the reaction was continued at 20° C. for 1 hour. After completion of the reaction, 1600 mL of supernatant was removed and the residue was washed twice with 1600 mL of hexane to prepare a solid catalyst component [A-2]. The amounts of titanium and chlorine contained in 1 g of the solid catalyst component were found to be 3.61 mmol and 11.3 mmol, respectively.

Solid Catalyst 3

Comparative Example (1) Preparation of Solid Catalyst Component [A-3]

A homogeneous solution was formed by reacting 480 g of anhydrous magnesium chloride, 2.5 L of decalin, and 2.32 L of 2-ethylhexyl alcohol under heating at 130° C. for 2 hours. Then, 1.11 kg of phthalic anhydride was added into the solution and the whole was stirred and mixed for another 1 hour at 130° C. to dissolve phthalic anhydride into the homogeneous solution. After the homogeneous solution thus obtained was cooled to room temperature, the whole amount thereof was charged dropwise into 20 L of titanium tetrachloride kept at −20° C. over a period of 1 hour. After completion of charging, the temperature of the mixed solution was elevated to 110° C. over a period of 4 hours. When the temperature reached 110° C., 270 mL of diisobutyl phthalate was added and the whole was kept at the same temperature for another 2 hours under stirring. After completion of 2 hours of the reaction, a solid portion was collected by hot filtration and then was thoroughly washed with hexane at 110° C. until the concentration of free titanium compound in the washing liquid decreased to 0.1 mmol/L or less, whereby a solid catalyst component [A-3] was prepared. The amounts of titanium and chlorine contained in 1 g of the solid catalyst component were found to be 0.70 mmol and 17.1 mmol, respectively.

Example 1

Polymerization

Hexane, ethylene, 1-butene, and a catalyst were continuously fed into a vessel-type 200 L polymerization reactor fitted with a stirring apparatus. The polymerization temperature was kept at 70° C. by means of a jacket. Hexane as a solvent was fed at 65 L/hour. As the catalyst, triisobutylaluminum and the solid catalyst 1 were continuously fed by means of a pump so that the rate of polymer production was 6 kg/hour. Buten-1 was continuously fed by means of a pump so that a gas-phase concentration of 5 mol % was maintained. Ethylene was continuously fed so that the polymerization pressure was maintained at 0.3 MPa. The polymerization slurry was continuously discharged so that the level in the polymerization reactor was maintained constant. The slurry discharged was transferred to a drying step via a solvent-separating step. A stable and continuous operation could be carried out with no presence of agglomerated polymer and without occlusion of a slurry-discharging pipe. A catalytic activity was 20,000 g-PE/g-catalyst. η of the resulting ultra-high-molecular-weight ethylene copolymer in decalin (135° C.) was 14.9 dl/g and Mv determined from the η value was 3,000,000. Bulk density was so high as 0.44 g/cm$^3$. Haze as a measure of transparency was 53% and thus the copolymer was extremely excellent in transparency. Density was 0.9.19 g/cm$^3$. These results including the other values are shown in Table 1.

Comparative Example 1

Polymerization was carried out in the same manner as in Example 1 except that the solid catalyst 2 was used. As a result, η of the resulting ultrahigh-molecular-weight ethylene copolymer was 10.2 dl/g and Mv was 1,700,000. Bulk density was 0.32 g/cm$^3$, which was remarkably low as compared with that in Example 1. Haze as a measure of transparency was 71%. Density was 0.920 g/cm$^3$. These results including the other values are shown in Table 1.

Example 2

Polymerization was carried out in the same manner as in Example 1 except that the gas-phase concentration of 1-butene was changed to 2 mol %. As a result, η of the resulting ultrahigh-molecular-weight ethylene copolymer was 16.6 dl/g and Mv was 3,500,000. Bulk density was 0.45 g/cm$^3$. Haze as a measure of transparency was 69%. Density was 0.922 g/cm$^3$. These results including the other values are shown in Table 1.

Example 3

Polymerization was carried out in the same manner as in Example 1 except that the gas-phase concentration of 1-butene was changed to 10 mol %. As a result, η of the resulting ultrahigh-molecular-weight ethylene copolymer was 12.9 dl/g and Mv was 2,400,000. Bulk density was 0.43 g/cm$^3$. Haze as a measure of transparency was 46%. Density was 0.917 g/cm$^3$. These results including the other values are shown in Table 1.

Example 4

Polymerization was carried out in the same manner as in Example 1 except that the polymerization temperature was changed to 60° C. As a result, η of the resulting ultrahigh-molecular-weight ethylene copolymer was 18.1 dl/g and Mv was 4,000,000. Bulk density was 0.42 g/cm$^3$ Haze as a measure of transparency was 50%. Density was 0.918 g/cm$^3$. These results including the other values are shown in Table 1.

Comparative Example 2

Polymerization was carried out in the same manner as in Example 3 except that the solid catalyst 2 was used. As a result, an agglomerated polymer was present in an ultrahigh-molecular-weight ethylene copolymer discharged from the drying step. A continuous operation could be carried out without occlusion of a slurry-discharging pipe but η of the resulting ultrahigh-molecular-weight ethylene copolymer was 8.1 dl/g and Mv was 1,200,000, which were remarkably low as compared with those in Example 3. Bulk density was 0.25 g/cm$^3$, which was remarkably low as compared with that in Example 3. Haze as a measure of transparency was 70%. Density was 0.920 g/cm$^3$. These results including the other values are shown in Table 1.

Comparative Example 3

Polymerization was carried out in the same manner as in Example 1 except that 1-butene was not used. As a result, η of the resulting ultrahigh-molecular-weight ethylene copolymer was 21.0 dl/g and Mv was 5,000,000. Bulk density was 0.40 g/cm$^3$. Haze as a measure of transparency was 82%, which was remarkably high as compared with that in Example 1. Density was 0.928 g/cm$^3$. These results including the other values are shown in Table 1.

Comparative Example 4

Polymerization was carried out in the same manner as in Example 1 except that the solid catalyst 3 was used. As a result, η of the resulting ultrahigh-molecular-weight ethylene copolymer was 13.8 dl/g and Mv was 2,670,000. Bulk density was 0.30 g/cm$^3$, which was remarkably low as compared with that in Example 1. Haze as a measure of transparency was 58%. Density was 0.921 g/cm$^3$. These results including the other values are shown in Table 1.

TABLE 1

| No. | Catalyst | Ti concentration in catalyst mmol/g-catalyst | Cl concentration in catalyst mmol/g-catalyst | Polymerization temperature °C. | 1-Butene mol % | Catalytic activity g/g-catalyst | Bulk density g/cm³ | Intrinsic viscosity dl/g | Molecular weight ×10000 | Haze % | Density g/cm³ |
|---|---|---|---|---|---|---|---|---|---|---|---|
| Example 1 | A-1 | 0.98 | 14.9 | 70 | 5 | 20000 | 0.44 | 14.9 | 300 | 53 | 0.919 |
| Comparative Example 1 | A-2 | 3.61 | 11.3 | 70 | 5 | 35000 | 0.32 | 10.2 | 170 | 71 | 0.920 |
| Example 2 | A-1 | 0.98 | 14.9 | 70 | 2 | 18000 | 0.45 | 16.6 | 350 | 69 | 0.922 |
| Example 3 | A-1 | 0.98 | 14.9 | 70 | 10 | 22000 | 0.43 | 12.9 | 240 | 46 | 0.917 |
| Example 4 | A-1 | 0.98 | 14.9 | 60 | 5 | 16000 | 0.42 | 18.1 | 400 | 50 | 0.918 |
| Comparative Example 2 | A-2 | 3.61 | 11.3 | 70 | 10 | 45000 | 0.25 | 8.1 | 120 | 70 | 0.920 |
| Comparative Example 3 | A-1 | 0.98 | 14.9 | 70 | 0 | 18000 | 0.40 | 21.0 | 500 | 82 | 0.928 |
| Comparative Example 4 | A-3 | 0.70 | 17.1 | 70 | 10 | 17000 | 0.30 | 13.8 | 267 | 58 | 0.921 |

While the invention has been described in detail and with reference to specific embodiments thereof, it will be apparent to one skilled in the art that various changes and modifications can be made therein without departing from the spirit and scope thereof.

The present application is based on Japanese Patent Application No. 2004-378468 filed on Dec. 28, 2004, and the contents are incorporated herein by reference.

INDUSTRIAL APPLICABILITY

Since the ultrahigh-molecular-weight ethylene copolymer of the invention is excellent in transparency and flexibility and also excellent in abrasion resistance, low friction, and strength, it can be suitably utilized in the fields of sliding members such as gear, bearing members, artificial joint substitutes, sole materials for skis, sole materials for snowboards, polishing materials, slip sheets for various magnetic tapes, liners for flexible discs, bulletproof members, battery separators, various filters, foams, films, pipes, fibers, threads, fishing lines, cutting boards, and the like.

The invention claimed is:

1. An ultrahigh-molecular-weight ethylene copolymer powder having an intrinsic viscosity (η) of 12.9 dl/g to 34 dl/g, obtained by copolymerizing ethylene and at least one olefin selected from the group consisting of α-olefins having 3 to 20 carbon atoms, cyclic olefins having 3 to 20 carbon atoms, compounds represented by the formula $CH_2=CHR^1$ wherein $R^1$ is an aryl group having 6 to 20 carbon atoms, and linear, branched or cyclic dienes having 4 to 20 carbon atoms, wherein (1) a molded article of the copolymer powder, which is molded by pressing the copolymer powder according to ASTM D1928 Procedure C, has a haze according to a method of ASTM D1003 of from 30% to 69%, (2) the copolymer powder has a bulk density of from 0.42 g/cm³ to 0.60 g/cm³, and (3) wherein the molded article of the copolymer powder has a density measured according to ASTM D1505 ranging from 0.900 to 0.922 g/cm³.

2. A molded article obtained from the ultrahigh-molecular-weight ethylene copolymer powder according to claim 1.

3. A process for producing an ultrahigh-molecular-weight ethylene copolymer powder having an intrinsic viscosity (η) of 12.9 dl/g to 34 dl/g, obtainable by copolymerizing ethylene and at least one olefin selected from the group consisting of α-olefins having 3 to 20 carbon atoms, cyclic olefins having 3 to 20 carbon atoms, compounds represented by the formula $CH_2=CHR^1$ wherein $R^1$ is an aryl group having 6 to 20 carbon atoms, and linear, branched or cyclic dienes having 4 to 20 carbon atoms, wherein (1) a molded article of the copolymer powder, which is molded by pressing the copolymer powder according to ASTM D1928 Procedure C, has a haze according to a method of ASTM D1003 of from 30% to 80%, (2) the copolymer powder has a bulk density of from 0.42 g/cm³ to 0.60 g/cm³, and (3) wherein the molded article of the copolymer powder has a density measured according to ASTM D1505 ranging from 0.900 to 0.940 g/cm³, said process comprising copolymerizing ethylene and at least one olefin selected from the group consisting of α-olefins having 3 to 20 carbon atoms, cyclic olefins having 3 to 20 carbon atoms, compounds represented by the formula $CH_2=CHR^1$ wherein $R^1$ is an aryl group having 6 to 20 carbon atoms, and linear, branched or cyclic dienes having 4 to 20 carbon atoms, in the presence of an olefin polymerization catalyst which comprises a solid catalyst component [A] and an organometallic compound component [B], and wherein the solid catalyst component [A] is prepared by supporting a titanium compound (A-2) represented by the below-shown general formula III on a support (A-1) prepared by a reaction of an organomagnesium compound represented by the below-shown general formula I soluble in an inert hydrocarbon solvent with a chlorinating agent represented by the below-shown general formula II at a temperature of 60° C. to 150° C.;

$$(M^1)_\alpha (Mg)_\beta (R^2)_a (R^3)_b (OR^4)_c \quad (I)$$

wherein $M^1$ is a metal atom selected from the group consisting of Group 1, Group 2, Group 12, and Group 13 of the periodic table except magnesium, $R^2$, $R^3$, and $R^4$ each is a hydrocarbon group having 2 to 20 carbon atoms, and α, β, a, b, and c each is a real number satisfying the following relations: $0 \leq \alpha$, $0 < \beta$, $0 \leq a$, $0 \leq c$, $0 < a+b$, $0 \leq c/(\alpha+\beta) \leq 2$, $k\alpha + 2\beta = a+b+c$ (wherein k is an atomic valency of $M^1$), $$H_d SiCl_e R^5_{(4-(d+e))} \quad (II)$$

wherein $R^5$ is a hydrocarbon group having 1 to 12 carbon atoms and d and e each is a real number satisfying the following relations: $0 < d$, $0 < e$, $0 < d+e \leq 4$, $$Ti(OR^6)_f X_{(4-f)} \quad (III)$$

wherein f is a real number of 0 to 4, $R^6$ is a hydrocarbon group having 1 to 20 carbon atoms, and X is a halogen atom, wherein the organomagnesium compound represented by the formula I is $(Al)Mg_5(C_4H_9)_{11}(OC_3H_7)_2$, and the chlorinating agent represented by the general formula II is $HOSiCl_3$.

* * * * *